US006227921B1

United States Patent
Feehan

(10) Patent No.: US 6,227,921 B1
(45) Date of Patent: May 8, 2001

(54) MARINE PROPULSION DEVICE WITH AN OIL GAGE ACCESSIBLE THROUGH A COWL

(75) Inventor: Richard J. Feehan, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/505,053

(22) Filed: Feb. 16, 2000

(51) Int. Cl.[7] .................................................... B63H 21/10
(52) U.S. Cl. ............................ 440/88; 33/730; 123/196 P
(58) Field of Search ................................ 440/88; 33/730; 123/195 P, 196 R

(56) References Cited

U.S. PATENT DOCUMENTS

| 4,330,940 | 5/1982 | Leitgeb | 33/126.7 R |
|---|---|---|---|
| 4,828,519 | 5/1989 | Watanabe | 440/88 |
| 4,903,653 | 2/1990 | Slattery | 123/195 P |
| 4,913,109 | 4/1990 | Slattery | 123/196 R |
| 5,037,340 | * 8/1991 | Shibata | 440/88 |
| 5,163,394 | 11/1992 | Koishikawa et al. | 123/196 W |
| 5,199,614 | 4/1993 | Marsh | 440/88 |
| 5,487,687 | 1/1996 | Idzikowski et al. | 440/77 |

* cited by examiner

Primary Examiner—Jesus D. Sotelo
(74) Attorney, Agent, or Firm—William D. Lanyi

(57) ABSTRACT

A marine propulsion device, such as an outboard motor, is provided with an oil measuring gage or dipstick which is accessible by the operator of the outboard motor without having to remove the cowl from the device. A first end of the dipstick extends through a dipstick tube into the oil sump of the outboard motor and a second end of the dipstick is connected to a handle that extends through the cowl. The handle is shaped to be retained in a hole formed through the cowl in such a way that the hole is sealed by a portion of the handle to prevent water from passing into the engine compartment through the cowl. A dampening mechanism is provided to dampen vibrations that would otherwise be transmitted between the handle and the dipstick.

20 Claims, 3 Drawing Sheets

MARINE PROPULSION DEVICE WITH AN OIL GAGE ACCESSIBLE THROUGH A COWL

BACKGROUND OF THE INVENTION

1. Field of the Invention

The present invention is generally related to an oil measuring gage and, more particularly, to an oil measuring gage that is accessible through a cowl of a marine propulsion device, such as an outboard motor, without the necessity for the operator to remove the cowl from the outboard motor.

2. Description of the Prior Art

When an internal engine comprises an oil sump or oil storage reservoir, it is necessary to provide some means to determine the magnitude of the quantity of oil within the oil sump or reservoir. In many different types of internal combustion engines, an oil measuring gage, such as a dipstick, is provided to allow an operator to remove the oil measuring gage from an oil sump region and inspect the gage to determine the magnitude of the oil quantity within the oil sump. In an automobile engine, it is typical to provide a dipstick within the engine compartment for the purposes described above. The operator or service technician raises the hood of the car to expose a handle of the dipstick and then removes the dipstick to determine the quantity of oil within an oil sump or oil reservoir. This is true in automobile engines, lawn tractors, off-road equipment, and many other types of engine driven vehicles.

Outboard motors that comprise oil reservoirs, such as oil sumps, require that the operator first remove the cowl of the outboard motor to expose the handle of the dipstick before being able to measure the magnitude of the oil quantity within the oil sump. This procedure of removing the cowl is often cumbersome and, in certain circumstances when the boat is distant from a dock, creates a risk of dropping the cowl overboard during this procedure.

U.S. Pat. No. 5,487,687, which issued to Idzikowski et al on Jan. 30, 1996, describes a midsection and cowl assembly for an outboard marine drive. The outboard marine drive has a midsection between the upper power head and the lower gear case and has a removable midsection cowl assembly including first and second cowl sections. The midsection housing includes an oil sump in one embodiment and further includes an exhaust passage partially encircled by cooling water and partially encircled by engine oil for muffling engine exhaust noise. The midsection housing also has an oil drain arrangement providing complete and clean oil draining while the outboard drive is mounted on a boat and in the water wherein the operator can change oil without leaving the confines of the boat and entering the water. In U.S. Pat. No. 5,487,687, a dipstick is identified by reference numeral 164.

U.S. Pat. No. 4,828,519, which issued to Watanabe on May 9, 1989, discloses an outboard motor that has an improved lubricating system for the internal combustion engine. A lubricant sump is positioned beneath the engine and oil is returned to the sump through a drain opening in a spacer plate that separates the engine from the drive shaft housing. The oil sump and drain opening are configured so that oil will not return from the sump through the drain opening to the engine when the outboard motor is laid on its side edge. An oil measuring gage or dipstick, is identified by reference numeral 62 in U.S. Pat. No. 4,828,519.

U.S. Pat. No. 4,913,109, which issued to Slattery on Apr. 3, 1990, describes a marine outboard drive with an oil tank fill tube. A marine outboard drive unit includes a two-cycle internal combustion engine, an oil storage tank storing lubricating oil for the engine, and a fill tube within the engine cowl for filling the oil tank there below. The fill tube includes a partitioned upper cup portion vented to the tank and closed by a tactilely hinged cap.

U.S. Pat. No. 5,199,914, which issued to Marsh on Apr. 6, 1993, describes a four stroke outboard motor crankcase oil drain plug opening attachment. The attachment is described to facilitate drainage and collection of crankcase oil from four cycle outboard motors. The attachment includes a manually operable valve attached by a fitting to the motor drain plug opening. The valve extends to a flexible downspout that extends on downwardly to an auxiliary plug at a bottom end thereof. The valve includes an operator that can be rotated selectively to open and close the valve. The plug can be selectively removed and adds a redundancy feature to facilitate unintentional drainage of oil by operation of the valve. An oil drainage collector including an opening and a top end and a bale mounted thereon, may be selectively secured over the valve to facilitate collection of the oil. The opening and downspout and bale are related dimensionally such that the collector container cannot swing free of the downspout when the bale is secured over the valve.

U.S. Pat. No. 5,163,394, which issued to Koishikawa et al on Nov. 17, 1992, describes an engine with horizontal cylinders and an outboard engine assembly having such an engine. The engine assembly includes a cylinder block with at least one horizontal cylinder define therein. An oil pan disposed downwardly of the cylinder block, a cylinder head coupled to the cylinder block, and a head cover coupled to the cylinder head. The engine assembly also includes a valve operating mechanism chamber defined jointly between the cylinder head and the head cover. A lubricating oil supply passageway for supplying lubricating oil from the oil pan to at least the valve operating mechanism chamber, and a lubricating oil return passageway for returning lubricating oil from at least the valve operating mechanism chamber to the oil pan. The lubricating oil return passageway has openings for introducing lubricating oil from the valve operating mechanism chamber. The openings are defined in inner surfaces, respectively, of the cylinder head and the head cover which face a bottom of the valve operating mechanism chamber.

U.S. Pat. No. 4,903,653, which issued to Slattery on Feb. 27, 1990, describes a marine outboard drive with an oil tank. The drive unit includes a power head having a two-cycle internal combustion engine, a lower depending driveshaft housing extending downwardly from the power head and having a lower submerged propeller, and an oil tank mounted adjacent the driveshaft housing below the power head. The oil tank has a u-shape and extends partially around and conforms to the driveshaft housing and is mounted in the space between the driveshaft housing and a trim cover which extends downwardly from the engine cowl. Particular mounting structure, rattle-reducing structure, and visual oil level monitoring structure is provided.

U.S. Pat. No. 4,330,940, which issued to Leitgeb on May 25, 1982, discloses a device for measuring the oil level in closed housings, especially of internal combustion engines and transmissions. The device is provided with a sleeve fixed to the housing, and a removable measuring rod or dipstick. A stopper to close the sleeve is secured to the dipstick, which also has an abutment to limit the insertion depth in the measuring position of the dipstick. That end of the sleeve inside the housing terminates below the minimum oil level, and the sleeve has holes or openings for equalizing the pressure to the interior of the housing located as far as possible above the maximum oil level. In the measuring position, during insertion of the dipstick up to the abutment, the stopper is located below the outer end of the sleeve by at least one and one-half times the oil column level corresponding to the overpressure in the housing.

The patents described above are hereby expressly incorporated by reference in the description of the preferred embodiment of the present invention.

Known marine propulsion devices with oil sumps or oil reservoirs do not allow the operator to manually remove an oil measuring gage from the oil sump without first removing a cowl of the marine propulsion device. It would therefore be significantly beneficial if a marine propulsion device, such as an outboard motor, could be provided in which an operator could manually remove an oil measuring gage and determine the magnitude of oil in the oil sump without first having to remove the cowl.

SUMMARY OF THE INVENTION

A marine propulsion device made in accordance with a preferred embodiment of the present invention comprises an engine having an output shaft for providing thrust for the marine propulsion device and a cowl attached to the marine propulsion device. It further comprises an oil sump containing a quantity of oil used to lubricate the engine and an oil measuring gage with a first end which extends into the oil sump for measuring the magnitude of the quantity of oil within the oil sump. It further comprises a handle formed at a second end of the oil measuring gage said handle being accessible to an operator of the marine propulsion device without having to remove the cowl from the marine propulsion device.

The oil measuring gage can be a dipstick that is removable from the oil sump to allow manual inspection of the first end of the oil measuring gage by an operator of a marine vessel. The marine propulsion device can be an outboard motor and the cowl can be manually removable from the marine propulsion device although the removing of the cowl from the marine propulsion device is not necessary in order to have access to the handle formed at the second end of the oil measuring gage. The cowl can be an upper cowl or a lower cowl of an outboard motor and the handle can extend from the side of the cowl, a front surface of the cowl, or a top surface of the cowl. In a particularly preferred embodiment of the present invention, the handle is attached to the oil measuring gage by a flexible elastomeric material.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
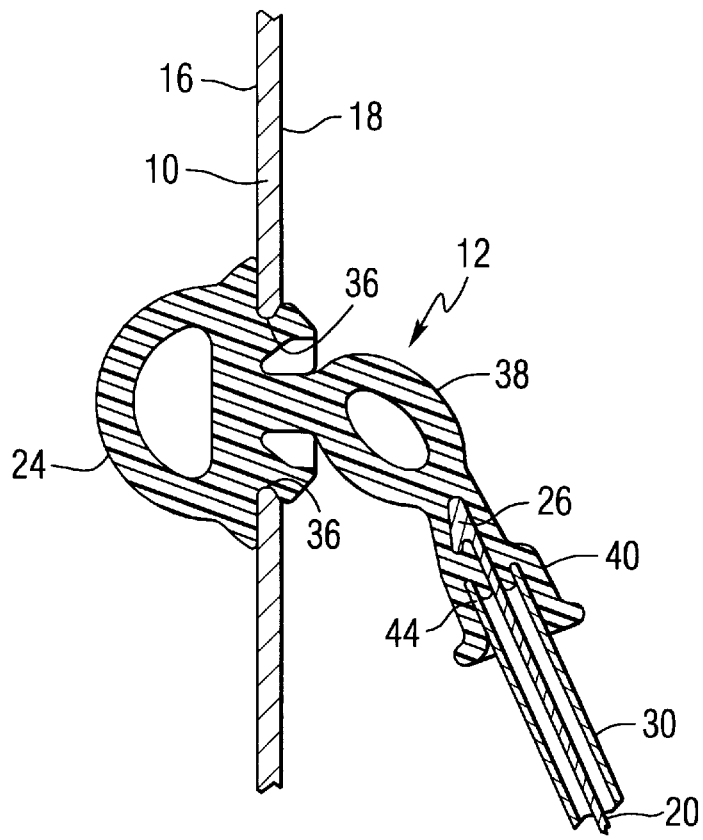
FIG. 1 provides a section view of one embodiment of the present invention.

Throughout the description of the preferred embodiment of the present invention, like components will be identified by like reference numerals.

In FIG. 1, a section view of the present invention shows a wall 10 of a cowl which provides a hole through the wall to accept an oil measuring gage 12 therethrough. An outside surface of the cowl is identified by reference numeral 16 and an inside surface of the cowl is identified by reference numeral 18 in FIG. 1. A dipstick 20 is shown extending from a handle 24 that is formed at a second end 26 of the oil measuring gage, or dipstick. The complete length of the dipstick 20 is not shown in FIG. 1, but it should be understood that the dipstick extends from the second end 26 to a first end which is disposed within an oil sump of a marine propulsion device. The dipstick 20 is shown extending within a tube 30 that is also shown in a partial view in FIG. 1.

Figure 2:
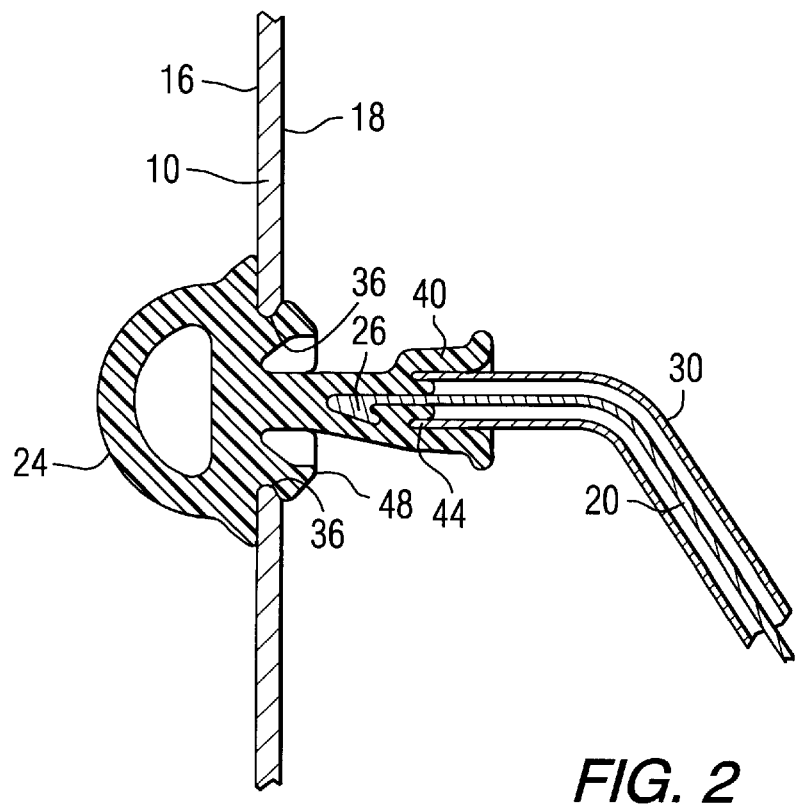
FIG. 2 shows an alternative embodiment of the present invention.
Figure 3:
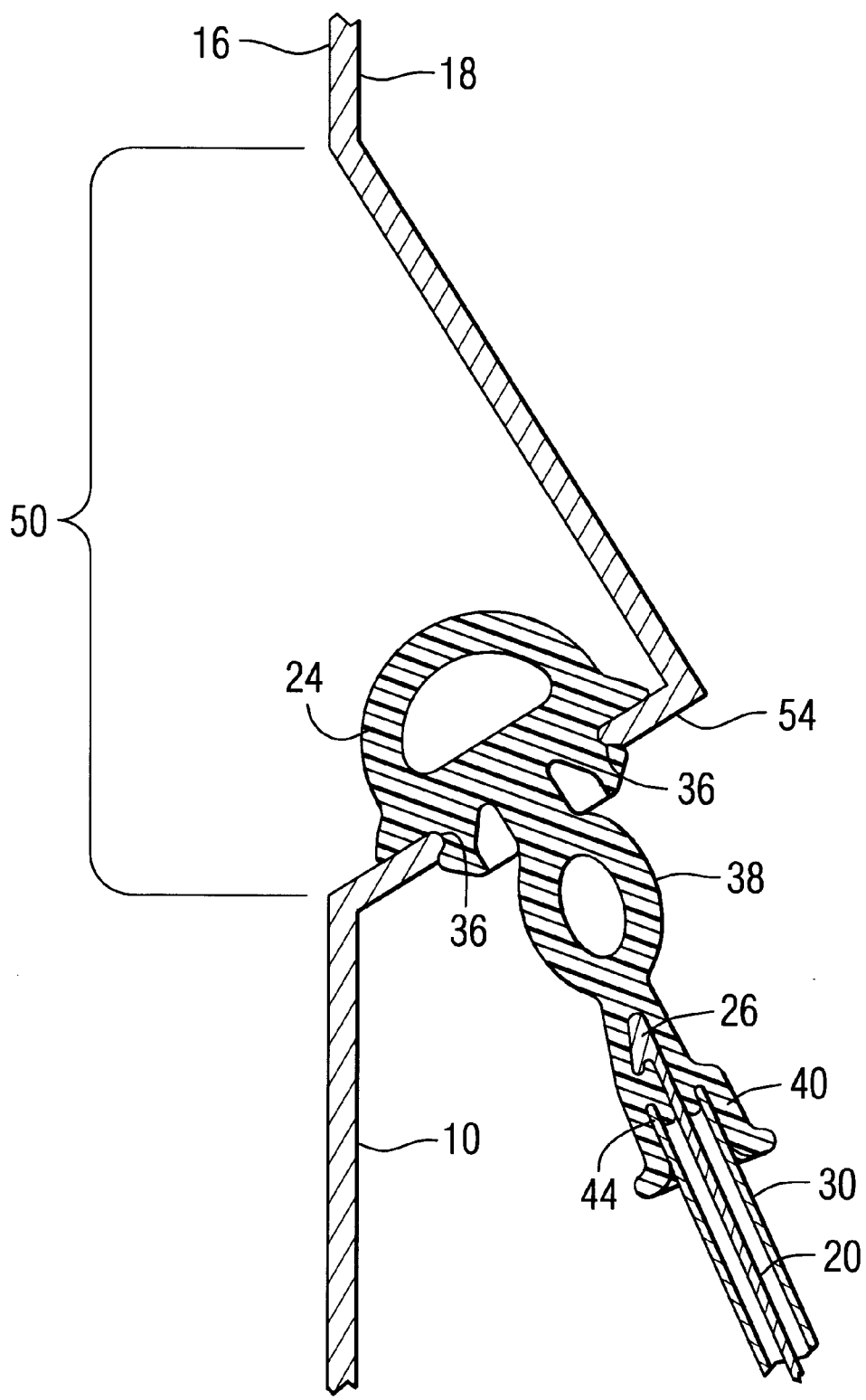
FIG. 3 shows a third embodiment of the present invention which employs a recessed portion in a cowl of an outboard motor.

In U.S. Pat. No. 5,487,687, the complete length of a dipstick 164 is shown in FIG. 2 along with a oil dipstick tube 166. In U.S. Pat. No. 4,828,519, an oil dipstick 62 is shown in FIG. 3 extending into a quantity of oil within an oil sump 46 having an oil level identified by reference numeral 61. The first end of the dipstick 62 illustrated in FIG. 3 of U.S. Pat. No. 4,828,519, extends into the oil and the second end extends upward and toward the right. The first end of the dipstick 164 in U.S. Pat. No. 5,487,687, extends downward and the second end of the dipstick 164 extends upward and terminates with a handle portion. The first end of the dipstick, in the terminology used herein to describe the present invention is the end of the dipstick that is initially inserted into the oil dipstick tube and extends downward into the oil sump. The second end of the dipstick remains accessible to an operator and comprises a handle portion.

With continued reference to FIG. 1, it can be seen that the handle 24 remains accessible from a position external to the outer surface 16 of the cowl wall 10 and can be gripped by an operator to remove the dipstick 20 from the internal portion under the cowl. The handle 24 is shaped to be received and firmly held by the edges 36 of the hole formed through the cowl wall 10. The second end 26 of the dipstick 30 is molded into the handle structure to firmly attach it to the handle. A flexible elastomeric material 38 is provided between the handle 24 and the first end of the dipstick 20. This elastomeric material, which is not required in all embodiments of the present invention, provides a certain amount of vibration dampening between the cowl wall 10 and the internal regions of the engine with which the dipstick 20 may be in contact. In the embodiment shown in FIG. 1, the elastomeric material is provided with a shape that further dampens the vibration. A portion of the handle, identified by reference numeral 40 in FIG. 1, is shaped to receive an end of the tube 30 in sealing relation therewith to prevent oil from passing upward and out of the tube 30 and to prevent water from flowing into the tube 30 during normal operation of the outboard motor.

In FIG. 2, the tube 30 is bent to facilitate the insertion of the first end of the dipstick 20 as the operator replaces the oil measuring gage within the tube 30. To replace the gage, the operator would initially insert the first end of the dipstick 20 into the most proximate end 44 of the tube 30 and then push the dipstick into the tube 30 by exerting a force on the handle 24 in a direction from left to right in FIG. 2. This force would be continued until the inner portion 48 of the handle 24 passes through the hole and over the edges 36 to hold the handle 24 in the position relative to the cowl surface 10 as shown in FIG. 2. The primary difference between the embodiments shown in FIGS. 1 and 2 is that the tube 30 can be positioned with its end 44 closer to the hole through the cowl surface 10 than shown in FIG. 1. Embodiment in FIG. 1, in certain applications, will require the operator to visually align the first end of the dipstick 20 with the end 44 of the tube 30.

FIG. 3 is generally similar to FIGS. 1 and 2, but with a recess 50 formed in the cowl's wall 10 to form a pocket in which the handle 24 is protected. The slope of surface 54 can be determined to provide alignment between the hole through the cowl and the tube 30. For example, it can be seen that an operator can insert the first end of the dipstick 20 through the hole in the cowl and into the tube 30 with a simple linear movement without requiring the dipstick 20 to bend, as would be required in the embodiment shown in FIG. 2. The embodiment of FIG. 3 further provides a certain degree of protection for the handle 24 to prevent it being struck by objects passing nearby the outer surface 16 of the cowl surface 10.

Figure 6:
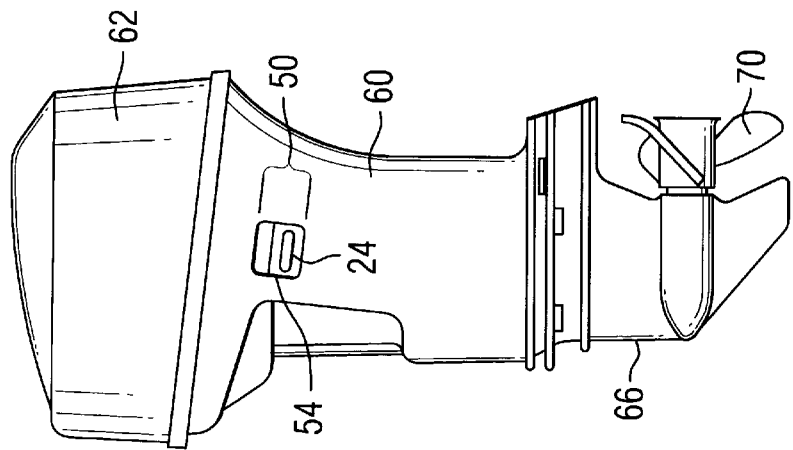
FIGS. 4, 5, and 6 show various locations where the handle of the dipstick can be positioned relative to the cowl of an outboard motor.
Figure 5:
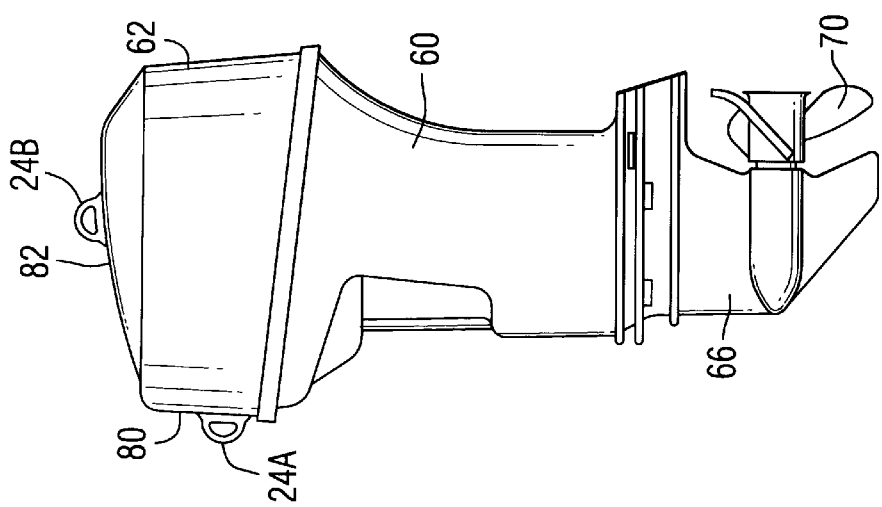
Figure 4:
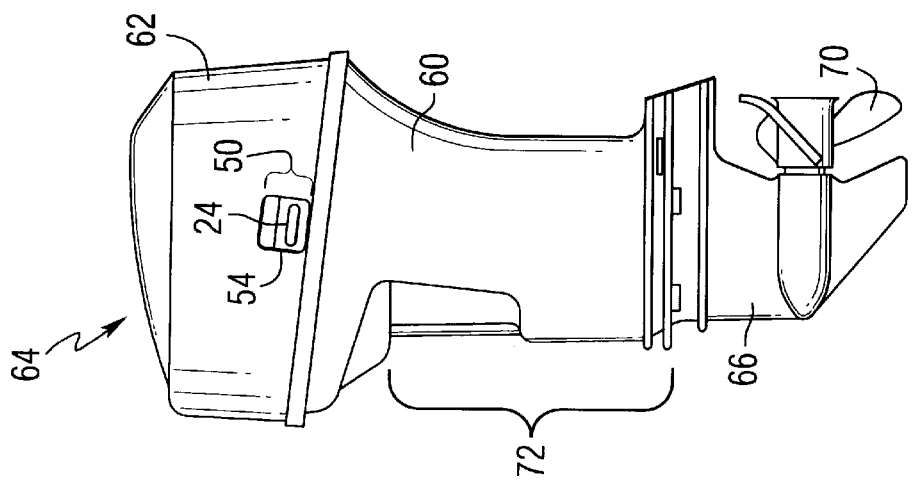

FIGS. 4, 5, and 6 show several different embodiments of the present invention. In FIG. 4, the outboard motor 64 shown as having a lower cowl 60 and an upper cowl 62. The upper cowl 62 is usually removable by an operator of the outboard motor 64 by loosening one or more latches and lifting the upper cowl 62 in a direction upward in FIG. 4. In some outboard motors, the lower cowl 60 is not removable from the outboard motor. However, as described in U.S. Pat. No. 5,487,687, the lower cowl can be removable in some versions of outboard motors.

With continued reference to FIG. 4, the outboard motor 64 has a gearcase 66 within which a propeller shaft is supported horizontally to drive a propeller 70. Although not specifically illustrated in FIGS. 4–6, it is well known to those skilled in the art that a drive shaft, or crankshaft, extends vertically through the leg 72 to connect to the engine which is under the upper cowl 62. The internal components of an outboard motor are described in detail in the United States patent identified above and will therefore not be described herein.

The embodiment of FIG. 4 shows the recess 50, surface 54, and the handle 24 positioned at the side of the upper cowl 62. In comparison, FIG. 6 shows the recess 50, surface 54, and handle 24 located at the side portion of the lower cowl 60. Either embodiment is within the scope of the present invention. FIG. 5 shows two alternative locations of the handle 24 of the present invention. 24A identifies the handle of the present invention extending from the front surface 80 of the upper cowl 62 while reference numeral 24B shows the handle extending upward through the upper surface 82 of the upper cowl 62. It should be clearly understood that the particular surface through which the handle 24 extends is not limiting to the present invention. Instead, the specific location of the handle 24 where it extends through a surface of the cowl of the outboard motor is more typically determined by the internal location of the dipstick tube 30 and the oil sump of the outboard motor. In FIGS. 4–6, the handle 24 is shown extending from the side of the upper cowl 62, the side of the lower cowl 60, the front of the upper cowl 62, and the top of the upper cowl 62.

Although not specifically shown in FIGS. 1–6, the cited prior art reference patents identified above show several locations for the known internal components of an outboard motor. For example, U.S. Pat. No. 5,487,687, shows the location of an oil sump 160 in relation to an oil dipstick tube 166 that is shaped to receive an oil dipstick 164. These are shown clearly in FIG. 2 of U.S. Pat No. 5,487,687. U.S. Pat. No. 4,828,519, clearly shows the relationship of the engine to the driveshaft 18 in FIG. 1 along with a relationship of driveshaft 18 to the propeller shaft and the propeller 21.

Although many types of oil sump reservoirs and dipsticks, or oil measuring gages, are well known to those skilled in the art, it is not known to provide a means for an operator to have access to the handle of the dipstick without having to remove the cowl from the outboard motor. Therefore, the present invention provides a significant benefit that is heretofore unknown in the prior art.

Although the present invention has been described with particular detail to show several different embodiments, it should be understood that other embodiments are also within its scope.

I claim:

1. A marine propulsion device, comprising:

an engine having an output shaft for providing thrust for said marine propulsion device;

a cowl attached to said marine propulsion device;

an oil sump containing a quantity of oil used to lubricate said engine, said oil sump being disposed within a cavity defined by said cowl;

a oil measuring gage with a first end which extends into said oil sump for measuring the magnitude of said quantity of oil within said oil sump;

a handle formed at a second end of said oil measuring gage, said oil measuring gage extending through an opening in said cowl, said handle being accessible to an operator of said marine propulsion device without having to remove said cowl from said marine propulsion device.

2. The marine propulsion device of claim 1, wherein:

said oil measuring gage is a dipstick that is removable from said oil sump to allow manual inspection of said first end of said oil measuring gage.

3. The marine propulsion device of claim 1, wherein:

said marine propulsion device is an outboard motor.

4. The marine propulsion device of claim 1, wherein:

said cowl is manually removable from said marine propulsion device.

5. The marine propulsion device of claim 1, wherein:

said cowl is an upper cowl.

6. The marine propulsion device of claim 1, wherein:

said cowl is a lower cowl.

7. The marine propulsion device of claim 1, wherein:

said handle extends from a side of said cowl.

8. The marine propulsion device of claim 1, wherein:

said handle extends from a front surface of said cowl.

9. The marine propulsion device of claim 1, wherein:

said handle is attached to said oil measuring gage by a flexible elastomeric material.

10. The marine propulsion device of claim 1, wherein:

said handle extends from a top surface of said cowl.

11. A marine propulsion device, comprising:

an engine having an output shaft for providing thrust for said marine propulsion device;

a cowl attached to said marine propulsion device;

an oil sump containing a quantity of oil used to lubricate said engine, said oil sump being disposed within a cavity defined by said cowl;

a oil measuring gage with a first end which extends into said oil sump for measuring the magnitude of said quantity of oil within said oil sump, said oil measuring gage being a dipstick that is removable from said oil sump to allow manual inspection of said first end of said oil measuring gage;

a handle formed at a second end of said oil measuring gage, said oil measuring gage extending through an opening in said cowl, said handle being accessible to an operator of said marine propulsion device without having to remove said cowl from said marine propulsion device.

12. The marine propulsion device of claim 11, wherein: said marine propulsion device is an outboard motor.

13. The marine propulsion device of claim 12, wherein: said cowl is manually removable from said marine propulsion device.

14. The marine propulsion device of claim 13, wherein: said cowl is an upper cowl.

15. The marine propulsion device of claim 12, wherein: said cowl is a lower cowl.

16. The marine propulsion device of claim 12, wherein: said handle extends from a side of said cowl.

17. The marine propulsion device of claim 14, wherein: said handle extends from a front surface of said cowl.

18. The marine propulsion device of claim 12, wherein: said handle is attached to said oil measuring gage by a flexible elastomeric material.

19. The marine propulsion device of claim 12, wherein: said handle extends from a top surface of said cowl.

20. A marine propulsion device, comprising:

an engine having an output shaft for providing thrust for said marine propulsion device, said marine propulsion device being an outboard motor;

a cowl attached to said marine propulsion device, said cowl being manually removable from said marine propulsion device;

an oil sump containing a quantity of oil used to lubricate said engine;

a oil measuring gage with a first end which extends into said oil sump for measuring the magnitude of said quantity of oil within said oil sump, said oil measuring gage being a dipstick that is removable from said oil sump to allow manual inspection of said first end of said oil measuring gage;

a handle formed at a second end of said oil measuring gage, said handle being accessible to an operator of said marine propulsion device without having to remove said cowl from said marine propulsion device, said handle is attached to said oil measuring gage by a flexible elastomeric material.

* * * * *